(12) United States Patent
Yang et al.

(10) Patent No.: US 11,475,811 B2
(45) Date of Patent: Oct. 18, 2022

(54) FLEXIBLE DISPLAY SUBSTRATE, METHOD FOR CONTROLLING SAME, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yang Yang, Beijing (CN); Xiaofeng Luo, Beijing (CN); KwangGyun Jang, Beijing (CN); Jaeseung Kim, Beijing (CN); Hongqiang Luo, Beijing (CN)

(73) Assignees: Chengdu BOE Optoelectronics Technology Co., Ltd., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/466,150

(22) Filed: Sep. 3, 2021

(65) Prior Publication Data

US 2022/0101766 A1    Mar. 31, 2022

(30) Foreign Application Priority Data

Sep. 30, 2020   (CN) .......................... 202011061061.0

(51) Int. Cl.
| | | |
|---|---|---|
| G09G 3/00 | (2006.01) | |
| G06F 3/041 | (2006.01) | |
| G06F 3/044 | (2006.01) | |

(52) U.S. Cl.
CPC ............. *G09G 3/035* (2020.08); *G06F 3/044* (2013.01); *G06F 3/0412* (2013.01); *G06F 2203/04102* (2013.01)

(58) Field of Classification Search
CPC ......... G06F 3/04164; G06F 3/041–047; G06F 2203/041–04114; G06F 3/0412
See application file for complete search history.

(56) References Cited

U.S. PATENT DOCUMENTS

2020/0211438 A1 *   7/2020   Park ..................... G06F 1/3265
2021/0223940 A1 *   7/2021   Li ........................ H01L 27/3244

* cited by examiner

*Primary Examiner* — Sanjiv D. Patel
(74) *Attorney, Agent, or Firm* — IPro, PLLC

(57) ABSTRACT

Embodiments of the present disclosure provide a flexible display substrate, a method for controlling same, and a display device. The flexible display substrate includes: a flexible base, having a display region and a bonding region; and a touch module, on a side of the flexible base, and having a plurality of touch electrodes. Each of the touch electrodes is connected to one connecting line. The touch electrodes are inside the display region. The connecting line extends to the bonding region. At least two of the connecting lines are connected to at least one pair of capacitor metal blocks. Each pair of the capacitor metal blocks are symmetrically distributed along a bending line. The flexible base is allowed to be bent along the bending line.

20 Claims, 6 Drawing Sheets

FLEXIBLE DISPLAY SUBSTRATE, METHOD FOR CONTROLLING SAME, AND DISPLAY DEVICE

CROSS REFERENCE TO RELATED APPLICATION

This application claims priority to Chinese Patent Application No. 202011061061.0, filed on Sep. 30, 2020 and entitled "FLEXIBLE DISPLAY PANEL, METHOD FOR CONTROLLING SAME, AND DISPLAY DEVICE", the entire contents of which are herein incorporated by reference.

TECHNICAL FIELD

The present disclosure relates to the field of display, and relates to a flexible display substrate, a method for controlling same, and a display device.

BACKGROUND

In the related art, in region-based touch, two touch integrated circuits (ICs, driving chips) are used in one product to implement control in different regions. The region-based touch facilitates mistouch prevention or the like for a foldable product in a folded state.

SUMMARY

Embodiments of the present disclosure provide a flexible display substrate, a method for controlling same, and a display device.

Embodiments of the present disclosure provide a flexible display substrate. The flexible display substrate includes: a flexible base, having a display region and a bonding region; and a touch module, on a side of the flexible base, and having a plurality of touch electrodes. Each of the touch electrodes is connected to one connecting line. The touch electrodes are inside the display region. The connecting line extends to the bonding region. At least two of the connecting lines are connected to at least one pair of capacitor metal blocks. Each pair of the capacitor metal blocks are symmetrically distributed along a bending line. The flexible base is allowed to be bent along the bending line. The flexible display substrate may use a single chip to implement the detection of a folded state of a screen, to turn on or off touch electrodes in a specific region. For example, capacitances between a plurality of capacitor metal blocks have different values in a folded state and an unfolded state, and the capacitor metal blocks are connected to touch driving electrodes. Therefore, a change in a capacitance between capacitor metal blocks at a bending line can be conveniently detected by using the touch driving electrodes, to determine a folded state of the substrate. That is, for the display substrate in the present disclosure, a simple process can be used, a foldable product and a rollable product can be supported while it is ensured that costs are not increased, or even multi-fold screens in the future can be supported. In terms of economic efficiency, there is no additional cost, and product performance can be improved. In terms of feasibility, there is no need for excessive elements, the flexible printed circuit (FPC) design is simplified, and circuit performance is ensured.

In some embodiments, the flexible display substrate further includes: grounding metal, in the bonding region of the flexible base; and a protection line, between the connecting lines and the grounding metal, wherein the capacitor metal blocks are between the grounding metal and the protection line. In this way, a grounding line and the protection line may be used to shield against electrical signals on electrodes such as the touch electrodes, thereby improving the accuracy of capacitance detection.

For example, the capacitor metal blocks are connected to the connecting lines by connecting metal, and the connecting metal crosses connecting lines and the protection line that are not connected to the connecting metal, and are connected to the capacitor metal blocks and the connecting lines by vias. The capacitor metal blocks can be conveniently connected to the connecting line.

In some embodiments, the capacitor metal block has a square cross section in a direction perpendicular to a thickness direction, and a side length of the square cross section is three to five times a line width of the connecting lines. The connection stability between the capacitor metal blocks and the connecting line can be further improved.

For example, the square cross section has a side length of 50 micrometers to 150 micrometers. The square is highly symmetrical and easily to align, and the side length is within an appropriate range, such that an inductive capacitance of a suitable capacitance value may be formed after folding.

In some embodiments, the flexible base is allowed to be bent with a bending radius of r along the bending line, and a distance between each pair of capacitor metal blocks symmetrically distributed along the bending line when the flexible base is not bent is πr. In this way, a folded state and a flat state can have a relatively large capacitance difference, such that it is easy to determine a status of the screen.

In some optional embodiments, the flexible base has a first side and a second side that are opposite to each other, the flexible base bends toward the second side along the bending line, and the capacitor metal blocks are on the first side, such that it is easy to determine a status of the screen.

In some embodiments, the flexible display substrate further includes a driving chip, wherein each of the touch electrodes is connected to the driving chip by the connecting line. Region-based control can be implemented by using only one chip, thereby helping to reduce costs.

In some embodiments, the flexible display substrate further includes a plurality of bending lines, wherein the flexible base is allowed to be folded or curved along the bending lines. The substrate may be folded or wound.

In some embodiments, the touch electrodes include a plurality of touch driving electrodes and a plurality of touch sensing electrodes, any two of the touch driving electrodes are parallel to each other, any two of the touch sensing electrodes are parallel to each other, an extension direction of the touch driving electrode is at an angle with an extension direction of the touch sensing electrode, one of the touch driving electrode and the touch sensing electrode, the extension direction of which is parallel to the bending line, is connected to the capacitor metal blocks.

Embodiments of the present disclosure provide a display device. According to the embodiment of the present disclosure, the display device includes the foregoing flexible display substrate. Therefore, the display device has all features and advantages of the foregoing flexible display substrate. Generally, the display device has advantages such as low costs, high reliability, and high technological adaptability, thereby facilitating wide application of the display device.

Embodiments of the present disclosure provide a method for controlling the flexible display substrate. The method includes: determining a state of the flexible display substrate based on a capacitance between at least one pair of capacitor metal blocks; and determining the on/off status of a plurality of touch electrodes in a touch module based on a bent state of the flexible display substrate. In this way, the on/off status of the touch electrodes can be conveniently controlled, thereby improving the operating stability of the flexible display substrate.

In some embodiments, the method for controlling the flexible display substrate includes: when the capacitance between the pair of capacitor metal blocks decreases, determining that the flexible display substrate is in the bent state, and turning off a plurality of touch electrodes in a predetermined region; and when the capacitance between the pair of capacitor metal blocks increases, determining that the flexible display substrate is in a flat state, and turning on each of the touch electrodes in the predetermined region. In this way, the status of the flexible display substrate can be accurately determined by using a change in the capacitance between the capacitor metal blocks, such that the reliable control of each of the touch electrodes can be conveniently implemented.

In some embodiments, each of the touch electrodes is connected to one driving chip, and the determining the on/off status of each of the touch electrodes in the touch module based on the bent state includes: determining an amount of change in the capacitance between each pair of capacitor metal blocks based on electrical signals of two touch electrodes that are respectively connected to the capacitor metal blocks; and controlling, by the driving chip, the on/off status of part of the touch electrodes based on the amount of change in the capacitance. In this way, the accurate control of the touch electrodes can be implemented by using a single chip, thereby helping to reduce the costs, and facilitates the wide application of display devices.

Figure 1:
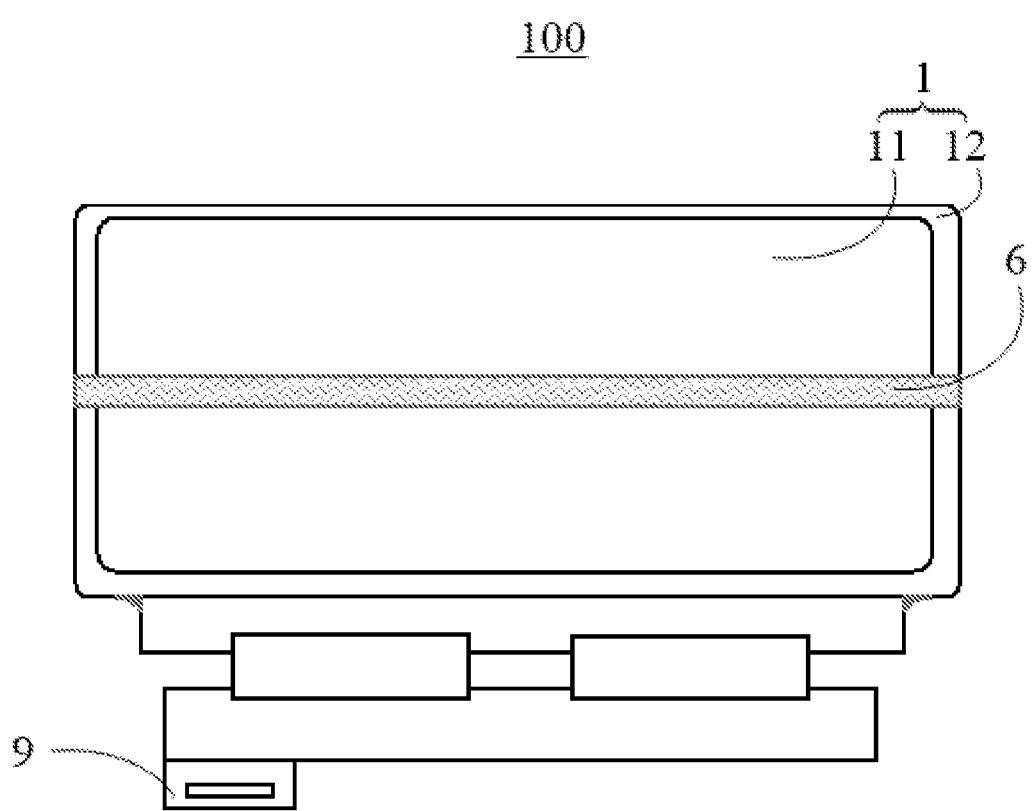
FIG. 1 is a schematic structural diagram of a flexible display substrate according to the present disclosure.

Reference numerals: flexible display substrate 100, flexible base 1, display region 11, bonding region 12, first side 13, second side 14, touch module 2, touch electrode 21, connecting line 3, connecting metal 4, capacitor metal block 5, bending line 6, bending region 61, grounding metal 7, protection line 8, driving chip 9, base 110, back circuit layer 120, planarization layer 130, cathode 140, via jumper layer 150, first dam structure 160, and second dam structure 170.

DETAILED DESCRIPTION

The embodiments of the present disclosure are described below in detail. Examples of the embodiments are shown in the accompanying drawings. The same or similar reference numerals indicate the same or similar parts or parts having the same or similar functions throughout the specification. The following embodiments by reference to the accompanying drawings are exemplary, and are only used to explain the present disclosure but cannot be explained as a limitation to the present disclosure.

In the related art, in region-based touch, two touch ICs are used in one product to implement control in different regions, but the region-based touch lacks applicability and economic efficiency. The reasons are as follows: first, the use of double touch ICs leads to a significant increase in costs; next, if a plurality of chips are used, a cascading manner is required for control, but resources that can support cascading and can meet requirements are insufficient at present; and third, in a multi-fold product or even a rollable product, folding and bending are required at a number of positions, and a manner of cascading a plurality of ICs in such a product is highly restricted. In addition, in a touch IC solution, a quantity of modular elements and a quantity of device regions are increased, leading to complex circuit design, and the technical reliability of the solution still needs to be verified.

Therefore, a current flexible display substrate, method for controlling same, and display device still need to be improved.

The present disclosure is completed according to the following knowledge and findings of the inventor:

At present, when a foldable screen with a touch function is in a folded state, part of touch electrodes need to be turned off, to avoid a mistouch in the folded state. For example, when the screen is folded toward a side of a light exit surface of display, the touch function in opposing parts of the folded display screen needs to be turned off, to avoid contact between two points on the screen under the action of an external force to avoid a mistouch. Alternatively, when the screen is folded toward a side opposite to a light exit side, a side of the screen after folding needs to be turned off to facilitate holding by a user on the side. However, at present, the turning off of touch electrodes depends on the control of a plurality of driving chips in a cascading manner. Therefore, the costs are relatively high, circuit design is complex, and the technical reliability still needs to be verified. If a single chip can be used to implement the detection of the folded state of the screen to turn on or off touch electrodes in a specific region, a simple process can be used, a foldable product and a rollable product can be supported while it is ensured that costs are not increased, or even multi-fold screens in the future can be supported. In terms of economic efficiency, there is no additional cost, and product performance can be improved. In terms of feasibility, there is no need for excessive elements, the FPC design is simplified, and circuit performance is ensured.

Figure 2:
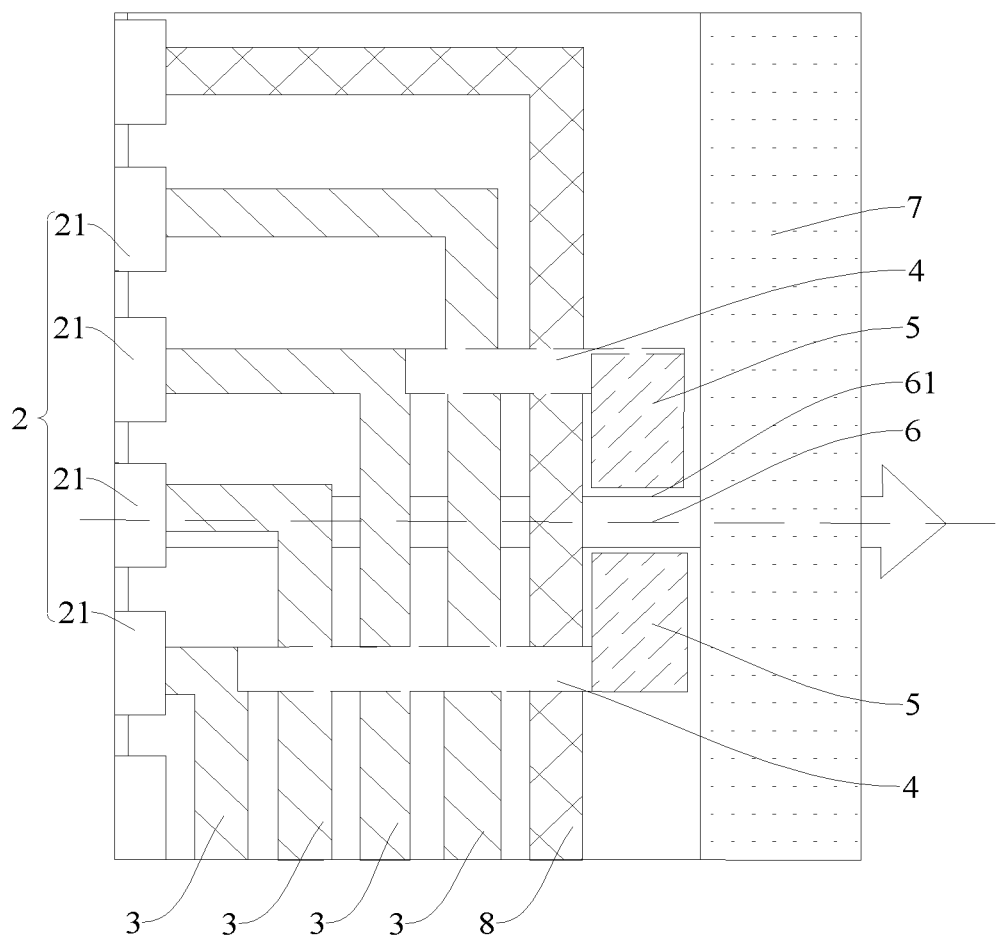
FIG. 2 is a schematic structural diagram of another flexible display substrate according to the present disclosure.

In view of this, in an aspect of the present disclosure, as shown in FIG. 1, embodiments of the present disclosure provide a flexible display substrate 100. The flexible display substrate 100 includes a flexible base 1. The flexible base 1 has a display region 11 and a bonding region 12. As shown in FIG. 2, the flexible display substrate 100 further includes a touch module 2. The touch module 2 is on a side of the flexible base 1. The touch module 2 has a plurality of touch electrodes 21. Each of the touch electrodes 21 is connected to one connecting line 3. The touch electrodes 21 are inside the display region 11. The connecting line 3 extends to the bonding region. At least two of the connecting lines 3 are connected to at least one pair of capacitor metal blocks 5. The two capacitor metal blocks 5 in the pair of capacitor metal blocks 5 are symmetrically distributed along a bending line 6. The flexible base 1 is allowed to be bent along the bending line 6.

For ease of understanding, the principle of control is first described below in brief When the flexible base 1 is in a flat state, the capacitor metal blocks 5 form a coupling capacitance under the action of a magnetic field. When a detection member such as a driving chip 9 is used to detect raw data (an initial mutual capacitance value), values of touch driving electrodes connected to the capacitor metal blocks 5 are greatly different from raw data in channels of the touch electrodes 21 of the capacitor metal blocks 5. After the flexible base 1 is bent, the positions of two adjacent capacitor metal blocks 5 change accordingly. As a result, the mutual capacitance value between the capacitor metal blocks 5 gradually decreases in a bending process. Values of raw data of two touch electrodes connected to the capacitor metal blocks 5 change. After processing by using an algorithm such as an IC algorithm, a status of the flexible display substrate 100 may be determined based on an amount of change in the values of the raw data before and after bending, to accurately locate information of a bent channel (that is, the bending line 6). That is, it is determined whether at this time the flexible base at the bending line is in a folded state or an unfolded state. Therefore, this can help the driving chip 9 to determine and turn off touch channels that are not required, that is, to turn off touch electrodes in part of region to isolate signals generated when channels (for example, touch electrodes) in the part are touched after folding, thereby eliminating mistouch interference, avoiding a mistouch or a random reporting point phenomenon during use, and improving product experience for a user.

In the flexible display substrate 100 according to the embodiment of the present disclosure, the unique design that the at least two of the connecting lines 3 are connected to the capacitor metal blocks 5 has the following advantages.

1. Low costs. In the flexible display substrate, capacitor metal blocks are only added in the bonding region, and the capacitor metal blocks are connected to touch driving electrodes. Electrical signals of the touch driving electrodes may be used to reflect a change in a capacitance value of the touch driving electrodes. There is no significant change to the wiring and touch driving manner of the flexible display substrate. Therefore, the flexible display substrate 100 can be designed based on a conventional FMLOC MASK (an etching photomask), and no additional costs are incurred.

2. High technological adaptability. The flexible display substrate may be applied to various types of flexible or bendable products, provided that when a bent state of the flexible substrate changes, the capacitance between the capacitor metal blocks changes accordingly. In this way, the arrangement positions of the capacitor metal blocks can be conveniently changed according to different foldable products, such that the flexible display substrate can resolve the touch problem of the foldable products, and is also applicable to rollable and foldable projects. In addition, if screens with more folds appear in future products, it is only necessary to increase a quantity of the capacitor metal blocks, such that this design can provide a mature solution to resolve the touch problem.

3. The technical maturity is high. Different from region-based touch proposed in the related art, the present disclosure may make improvements according to technologies that have been implemented, and it is not necessary to separately start a project to verify the stability of the region-based touch. For example, the capacitor metal blocks are connected to the touch driving electrodes. Therefore, the capacitance between the capacitor metal blocks may be confirmed during the detection of raw data (the initial mutual capacitance value), such that it is not necessary to improve a timing control strategy of an existing touch module, and it is also not necessary to add a driving chip or improve a cascading manner of driving chips. Therefore, the technical maturity is high.

4. The costs can be greatly reduced. As discussed above, to avoid a mistouch during the folding of a foldable product, it is usually necessary to arrange a plurality of driving chips in the display substrate to perform region-based control for a region in which it is necessary to shield against a touch signal. In the present disclosure, only one driving chip is needed to implement the confirmation of a touch status, such that a single chip can be used to directly turn off the sensing of an electrode in a region in which it is necessary to shield against a touch signal.

Figure 3:
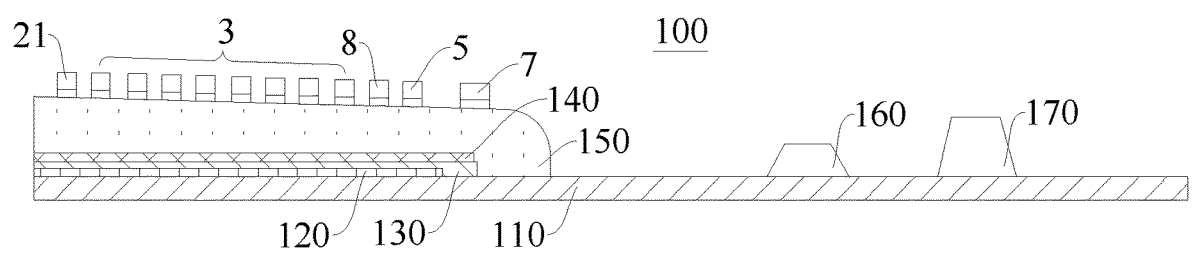
FIG. 3 is a cross-sectional view of the flexible display substrate in FIG. 2 in a direction parallel to a bending line.

In some embodiments, as shown in FIG. 3, the flexible display substrate 100 further includes a base 110, a back circuit layer 120, a planarization layer 130, a cathode 140, and a via jumper layer 150. For example, the back circuit layer 120 is on the base 110. The back circuit layer 120 may be configured to control the light emission of a light-emitting diode. The planarization layer 130 is on a side, away from the base 110, of the back circuit layer 120. The planarization layer 130 may be formed of an insulating material. The cathode 140 is on a side, away from the back circuit layer 120, of the planarization layer 130. The via jumper layer 150 is on a side, away from the planarization layer 130, of the cathode 140.

In some embodiments, in the flexible display substrate 100, a peripheral circuit region of the substrate has a plurality of groups of dam structures. As shown in FIG. 3, the peripheral circuit region of the substrate has a first dam structure 160 and a second dam structure 170. Certainly, in some other embodiments, there may be three groups of dam structures, or the like. A quantity of the dam structures is not limited herein.

In some embodiments, the touch electrodes 21 include a plurality of touch driving electrodes and a plurality of touch sensing electrodes. Any two of the touch driving electrodes are parallel to each other. Any two of the touch sensing electrodes are parallel to each other. An extension direction of the touch driving electrode is at an angle with an extension direction of the touch sensing electrode. The extension direction of the touch driving electrode is parallel to the bending line. The capacitor metal blocks are connected to the touch driving electrodes. Alternatively, the extension direction of the touch sensing electrode is parallel to the bending line. The capacitor metal blocks are connected to the touch sensing electrodes. That is, the extension direction of one of the touch driving electrode and the touch sensing electrode is parallel to the bending line. The capacitor metal blocks are connected to the one electrode.

The structures according to the present disclosure are described below in detail by using an example in which the extension direction of the touch driving electrode is parallel to the bending line.

In some embodiments, as shown in FIG. 2, the flexible display substrate 100 further includes grounding metal 7 and a protection line 8. The grounding metal 7 is in the bonding region 12 of the flexible base 1. The protection line 8 is between the connecting line 3 and the grounding metal 7. The capacitor metal blocks 5 are between the grounding metal 7 and the protection line 8. In this way, the grounding metal 7 may be used as a grounding line, and the grounding line and the protection line 8 are used to shield against electrical signals on electrodes such as the touch electrodes 21, thereby improving the accuracy of capacitance detection.

In some embodiments, as shown in FIG. 2, the capacitor metal block 5 has a square cross section in a direction perpendicular to a thickness direction, and a side length of the square cross section 5 is three to five times a line width of the connecting lines 3. In this way, the connection stability between the capacitor metal blocks 5 and the connecting line 3 can be improved, and the capacitor metal blocks 5 also have an appropriate area, such that an inductive capacitance of a suitable capacitance value may be formed.

For example, as shown in FIG. 2 and FIG. 3, the capacitor metal blocks 5 are connected to the connecting line 3 by connecting metal 4. The connecting metal 4 crosses connecting lines 3 and the protection line 8 that are not connected to the connecting metal 4, and are connected to the capacitor metal blocks 5 and the connecting line 3 by vias (not shown in the figure). In this way, the capacitor metal blocks 5 can be conveniently connected to the connecting line 3. The connecting metal 4 can avoid affecting other touch driving electrodes and connecting lines that are crossed by the connecting metal 4 and are not connected to the capacitor metal blocks, to implement isolation of interference.

Further, as shown in FIG. 2, the shape of the capacitor metal block 5 is not specially limited, provided that when the flexible base is bent, a change in a capacitance value between two capacitor metal blocks 5 on two sides of the bending line 6 is large enough to be detected by a driving chip. For example, the capacitor metal block 5 may be a square. It may be understood that the square is highly symmetrical and easy to align. Therefore, an accurate control requirement of the arrangement positions of the capacitor metal blocks 5 can be lowered, thereby further simplifying a production process.

According to some embodiments of the present disclosure, the side length of the square cross section of the capacitor metal block 5 is not specially limited. For example, when the square cross section of the capacitor metal block 5 is a square, the side length of the square may be 50 micrometers to 150 micrometers. A length range is appropriate when the side length falls within the foregoing range. In this case, after the capacitor metal blocks 5 are bent, an inductive capacitance of a suitable capacitance value can be formed.

Figure 4:
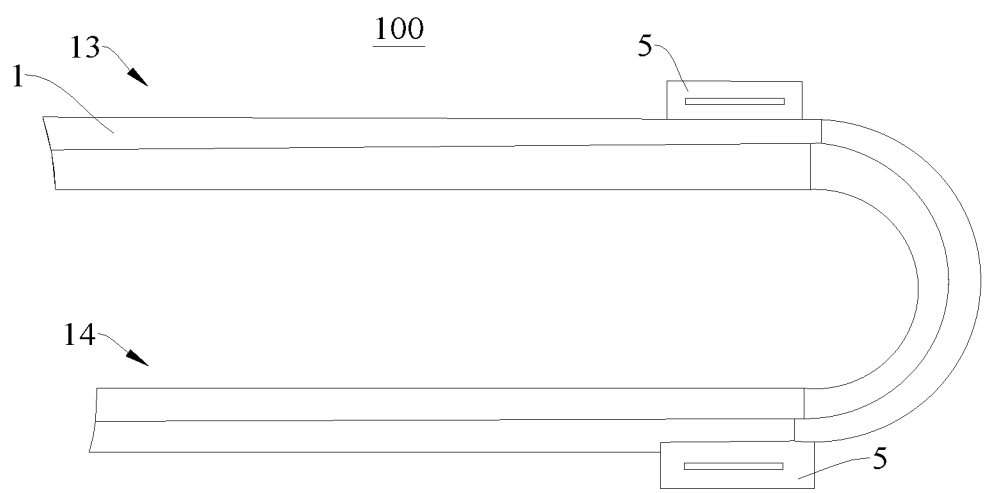
FIG. 4 is a schematic diagram of a flexible display substrate in a bent state according to the present disclosure.

In some embodiments, as shown in FIG. 2 and FIG. 4, the flexible base 1 is allowed to be bent with a bending radius of r along the bending line 6. A distance between each pair of capacitor metal blocks 5 symmetrically distributed along the bending line 6 when the flexible base 1 is not bent is $\pi r$. In this way, a folded state and a flat state can have a relatively large capacitance difference, such that it is easy to determine a status of the screen, and the operating sensitivity and stability of the flexible display substrate are further improved. As shown in FIG. 2, when the flexible base 1 is not bent, the two capacitor metal blocks 5 are on two sides of a bending region 61, and the bending region 61 is in the flat state. In this case, an electric field between each pair of capacitor metal blocks 5 is a planar electric field. When the flexible base 1 is bent, the bending region is in a bent state (as shown in FIG. 4). In this case, an electric field between each pair of capacitor metal blocks 5 is an opposite electric field. In this case, in the flat state (or an unfolded state) and the bent state, the change in the capacitance value between each pair of capacitor metal blocks 5 is relatively large, thereby helping a driving chip to quickly recognize a status of the flexible base 1.

In some optional embodiments, as shown in FIG. 4, the flexible base 1 has a first side 13 and a second side 14 that are opposite to each other. The flexible base 1 bends toward the second side 14 along the bending line 6. The capacitor metal blocks 5 are on the first side 13. In this way, it is easy to determine a status of the screen.

In some embodiments, as shown in FIG. 1, the flexible display substrate 100 further includes a driving chip 9. Each of the touch electrodes 21 is connected to the driving chip 9 by the connecting line 3. In this way, the flexible display substrate 100 can implement region-based control by using only one chip, thereby helping to reduce costs.

In some embodiments, the flexible display substrate 100 further includes a plurality of bending lines 6. That is, the flexible base may be bent a plurality of times along the plurality of bending lines. It needs to be specially noted herein that the term "bending" in the present disclosure should be understood in a broad sense. In some embodiments, the bending includes folding and curving. The substrate may be folded or wound, to provide more varied folding manners, thereby facilitating wide application in foldable products and rollable products.

For example, the flexible display substrate may be having the following structures. Referring to FIG. 2, the flexible base may be folded along a straight line in the middle of the flexible base. That is, the flexible base has one bending line 6. The bending line 6 is on the centerline of the flexible base in the width direction. The extension direction of the touch electrode 21 may be parallel to the bending line 6. The bending line 6 is at the center of one touch electrodes 21. Two touch electrodes 21 on two sides of the bending line 6 are connected to the capacitor metal blocks 5. The capacitor metal blocks 5 are connected to the connecting line 3 by the connecting metal 4 propped on a jumper.

Figure 5:
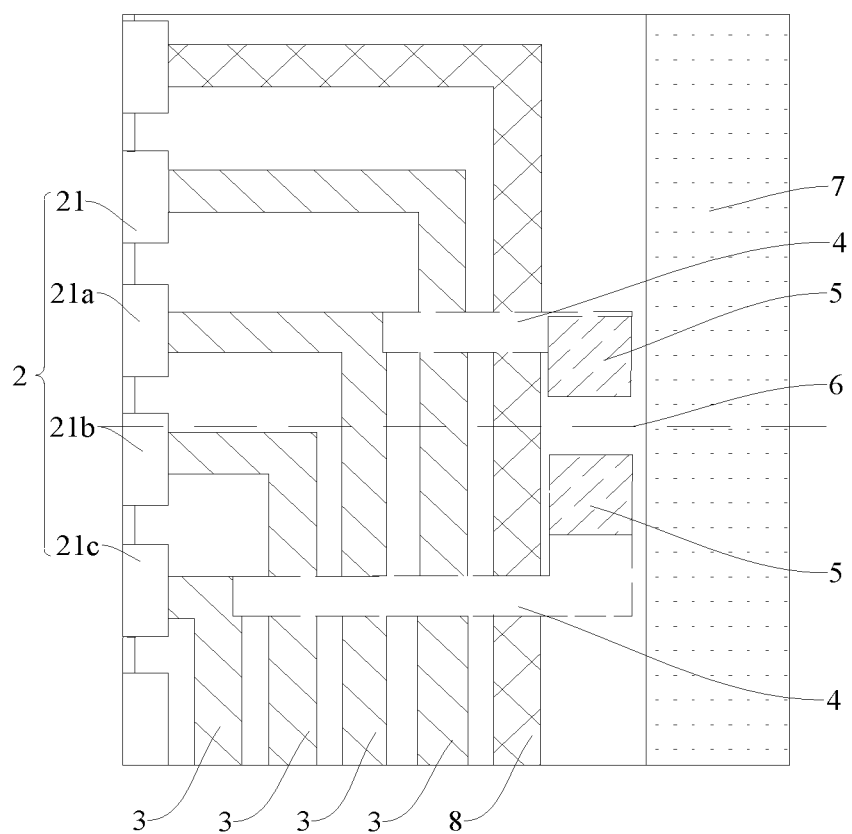
FIG. 5 is a schematic structural diagram of still another flexible display substrate according to the present disclosure.

Alternatively, referring to FIG. 5, the extension direction of the touch electrode 21 may be parallel to the bending line 6. However, the bending line 6 is between two adjacent touch electrodes 21 and has different distances from the two touch electrodes 21. That the bending line 6 is between the two adjacent touch electrodes 21 herein is that the bending line 6 is between the centers of the two adjacent touch electrodes 21. That is, the touch electrodes on two sides of the bending line 6 are not symmetrically distributed along the bending line 6. In this case, one of the two capacitor metal blocks 5 may be connected to the touch electrode 21a that is farther away from the bending line 6, and the other is connected to the touch electrode 21c adjacent to the touch electrode 21b that is closer to the bending line 6.

In another aspect of the present disclosure, embodiments of the present disclosure provide a display device. According to the embodiment of the present disclosure, the display substrate includes a power supply component and a flexible display substrate 100. The flexible display substrate 100 may be the foregoing flexible display substrate 100. The power supply component is configured to supply power to the flexible display substrate 100. Therefore, the display device has all features and advantages of the foregoing flexible display substrate 100. Generally, the display device has advantages such as low costs, high reliability, and high technological adaptability, thereby facilitating wide application of the display device.

During specific description, the display device provided in the embodiment of the present disclosure may be a mobile phone, a tablet computer, a television, a display, a notebook computer, a digital frame, a navigator or any other product or component having a display function.

Figure 6:
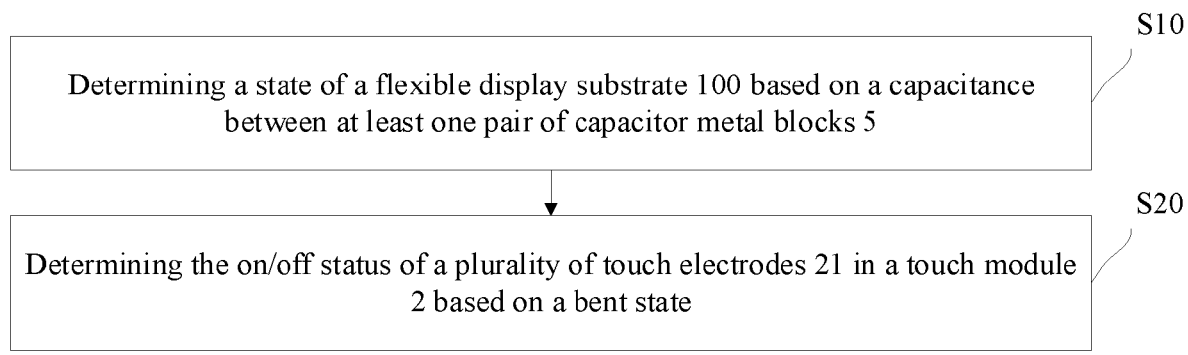
FIG. 6 is a flowchart of a method for controlling a flexible display substrate according to the present disclosure.

In another aspect of the present disclosure, embodiments of the present disclosure provide a method for controlling a flexible display substrate 100. Referring to FIG. 6, the method includes the following steps.

In S10, a status of the flexible display substrate 100 is determined based on a capacitance between each pair of capacitor metal blocks 5.

In S20, the on/off status of a plurality of touch electrodes 21 in a touch module 2 are determined based on a bent state of the flexible display substrate. In this way, the on/off status of the touch electrodes 21 can be conveniently controlled, to avoid a mistouch or a random reporting point situation during use caused by interference from the touching of unused channels in the bent state, thereby improving the operating stability of the flexible display substrate 100.

In some embodiments, the method for manufacturing a flexible display substrate 100 includes: when the capacitance between the pair of capacitor metal blocks 5 decreases, determining that the flexible display substrate 100 is in the bent state, and turning off a plurality of touch electrodes 21 in a predetermined region; and when the capacitance between the pair of capacitor metal blocks 5 increases, determining that the flexible display substrate 100 is in a flat state, and turning on each of the touch electrodes 21 in the predetermined region. It may be understood that the capacitor metal blocks 5 form a coupling capacitance under the action of a magnetic field, and in a process of changing the status of the flexible display substrate 100, the positions of the pair of capacitor metal blocks 5 change accordingly, such that the capacitance value between the pair of capacitor metal blocks 5 changes. In this way, the status of the flexible display substrate 100 can be accurately determined by using a change in the capacitance between the capacitor metal blocks 5, such that the reliable control of each of the touch electrodes 21 can be conveniently implemented.

In the embodiments of the present disclosure, the predetermined region is related to the folding manner of the screen. For example:

When the screen is folded toward a side of a light exit surface of display, the predetermined region is opposing regions after the display screen is folded. A touch function in the opposing regions of the folded display screen need to be turned off, to avoid contact between two points on the screen under the action of an external force to avoid a mistouch.

When the screen is folded toward a side opposite to a light exit side, the predetermined region is a side of the screen after folding. The side of the screen after folding is turned off to facilitate holding by a user on the side.

In some embodiments, each of the touch electrodes 21 is connected to one driving chip 9, and the determining the on/off status of each of the touch electrodes 21 in the touch module 2 based on the bent state includes: determining, by the driving chip 9, an amount of change in the capacitance between each pair of capacitor metal blocks 5 based on electrical signals of two touch electrodes 21 that are respectively connected to the capacitor metal blocks 5; and controlling, by the driving chip 9, the on/off status of part of the touch electrodes 21 based on the amount of change in the capacitance. In this way, the accurate control of the touch electrodes 21 can be implemented by using a single chip, thereby helping to reduce the costs, and facilitating the wide application of display devices.

In the description of the present disclosure, orientation or location relationships indicated by terms "up," "down," and the like are based on orientation or location relationships shown in the accompanying drawings, and are intended only to facilitate description of the present disclosure, but are not used to indicate that the present disclosure must be constructed and operated in specific orientations, and therefore, cannot be understood as a limitation to the present disclosure.

In the description of the specification, the description with reference to terms "an embodiment," "another embodiment," and the like indicate that specific features, structures, materials or characteristics described with reference to the embodiments are included in at least one embodiment of the present disclosure. In the specification, the schematic descriptions of the foregoing terms do not necessarily involve the same embodiments or examples. In addition, the described specific features, structures, materials or characteristics may be combined in an appropriate manner in any one or more embodiments or examples. In addition, persons skilled in the art may integrate and combine different embodiments or examples or features in different embodiments or examples in the specification without causing any contradictions.

Although the embodiments of the present disclosure have been shown and described above, it may be understood that the foregoing embodiments are examples and cannot be construed as limitations to the present disclosure. Persons of ordinary skill in the art may make changes, modifications, replacements, and variations to the foregoing embodiments within the scope of the present disclosure.

What is claimed is:

1. A flexible display substrate, comprising:
   a flexible base, having a display region and a bonding region; and
   a touch module, on a side of the flexible base, and having a plurality of touch electrodes, wherein each of the touch electrodes is connected to one connecting line, the touch electrodes are inside the display region, and the connecting line extends to the bonding region; and
   at least two of the connecting lines are connected to at least one pair of capacitor metal blocks, each pair of the capacitor metal blocks are symmetrically distributed along a bending line, and the flexible base is allowed to be bent along the bending line.

2. The flexible display substrate according to claim 1, further comprising:
   grounding metal, in the bonding region of the flexible base; and
   a protection line, between the connecting lines and the grounding metal,
   wherein the capacitor metal blocks are between the grounding metal and the protection line.

3. The flexible display substrate according to claim 2, wherein the capacitor metal blocks are connected to the connecting lines by connecting metal, and the connecting metal crosses connecting lines and the protection line that are not connected to the connecting metal, and are connected to the capacitor metal blocks and the connecting lines by vias.

4. The flexible display substrate according to claim 1, wherein the capacitor metal block has a square cross section in a direction perpendicular to a thickness direction, and a side length of the square cross section is three to five times a line width of the connecting lines.

5. The flexible display substrate according to claim 4, wherein the square cross section has a side length of 50 micrometers to 150 micrometers.

6. The flexible display substrate according to claim 5, wherein the flexible base has a first side and a second side that are opposite to each other, the flexible base bends toward the second side along the bending line, and the capacitor metal blocks are on the first side.

7. The flexible display substrate according to claim 1, wherein the flexible base is allowed to be bent with a bending radius of r along the bending line, and a distance between each pair of capacitor metal blocks symmetrically distributed along the bending line when the flexible base is not bent is πr.

8. The flexible display substrate according to claim 1, further comprising a driving chip, wherein each of the touch electrodes is connected to the driving chip by the connecting line.

9. The flexible display substrate according to claim 1, comprising a plurality of bending lines, wherein the flexible base is allowed to be folded or curved along the bending lines.

10. The flexible display substrate according to claim 1, wherein the touch electrodes comprise a plurality of touch driving electrodes and a plurality of touch sensing electrodes, any two of the touch driving electrodes are parallel to each other, any two of the touch sensing electrodes are parallel to each other, an extension direction of the touch driving electrode is at an angle with an extension direction of the touch sensing electrode,
one of the touch driving electrode and the touch sensing electrode, the extension direction of which is parallel to the bending line, is connected to the capacitor metal blocks.

11. A display device, comprising a flexible display substrate, wherein the flexible display substrate comprises:
a flexible base, having a display region and a bonding region; and
a touch module, on a side of the flexible base, and having a plurality of touch electrodes, wherein each of the touch electrodes is connected to one connecting line, the touch electrodes are inside the display region, and the connecting line extends to the bonding region, and
at least two of the connecting lines are connected to at least one pair of capacitor metal blocks, each pair of the capacitor metal blocks are symmetrically distributed along a bending line, and the flexible base is allowed to be bent along the bending line.

12. The display device according to claim 11, further comprising:
grounding metal, in the bonding region of the flexible base; and
a protection line, between the connecting lines and the grounding metal,
wherein the capacitor metal blocks are between the grounding metal and the protection line.

13. The display device according to claim 12, wherein the capacitor metal blocks are connected to the connecting lines by connecting metal, and the connecting metal crosses connecting lines and the protection line that are not connected to the connecting metal, and are connected to the capacitor metal blocks and the connecting lines by vias.

14. The display device according to claim 11, wherein the capacitor metal block has a square cross section in a direction perpendicular to a thickness direction, and a side length of the square cross section is three to five times a line width of the connecting lines.

15. The display device according to claim 14, wherein the square cross section has a side length of 50 micrometers to 150 micrometers.

16. The display device according to claim 15, wherein the flexible base has a first side and a second side that are opposite to each other, the flexible base bends toward the second side along the bending line, and the capacitor metal blocks are on the first side.

17. The display device according to claim 11, wherein the flexible base is allowed to be bent with a bending radius of r along the bending line, and a distance between each pair of capacitor metal blocks symmetrically distributed along the bending line when the flexible base is not bent is πr.

18. A method for controlling a flexible display substrate, wherein the flexible display substrate comprises: a flexible base, having a display region and a bonding region; and a touch module, on a side of the flexible base, and having a plurality of touch electrodes, wherein each of the touch electrodes is connected to one connecting line, the touch electrodes are inside the display region, the connecting line extends to the bonding region, at least two of the connecting lines are connected to at least one pair of capacitor metal blocks, each pair of the capacitor metal blocks are symmetrically distributed along a bending line, and the flexible base is allowed to be bent along the bending line; and the method comprises:
determining a state of the flexible display substrate based on a capacitance between each pair of capacitor metal blocks; and
determining an on/off status of each of the touch electrodes in the touch module based on a bent state of the flexible display substrate.

19. The method according to claim 18, comprising:
when the capacitance between the pair of capacitor metal blocks decreases, determining that the flexible display substrate is in the bent state, and turning off a plurality of touch electrodes in a predetermined region; and
when the capacitance between the pair of capacitor metal blocks increases, determining that the flexible display substrate is in a flat state, and turning on each of the touch electrodes in the predetermined region.

20. The method according to claim 18, wherein each of the touch electrodes is connected to one driving chip, and the determining the on/off status of each of the touch electrodes in the touch module based on the bent state comprises:
determining, by the driving chip, an amount of change in the capacitance between each pair of capacitor metal blocks based on electrical signals of two touch electrodes that are respectively connected to the capacitor metal blocks; and
controlling, by the driving chip, the on/off status of part of the touch electrodes based on the amount of change in the capacitance.

\* \* \* \* \*